United States Patent Office 3,217,692
Patented Nov. 16, 1965

3,217,692
LITTER AND BEDDING FOR POULTRY
George P. Hay, 3223 W. Seminole, Springfield, Mo.
No Drawing. Filed Nov. 13, 1963, Ser. No. 323,252
1 Claim. (Cl. 119—1)

This invention relates to the use of amorphous silica as a litter material in the raising of chickens and turkeys in the broiler industry. More particularly it relates to the use of suitably prepared amorphous silica as a litter and bedding material in the raising of young chickens and turkeys, in order to diminish the death rate among such fowl and to produce a heavier and healthier bird at the end of a given time interval than has heretofore been raised when other litter materials are used.

In addition to the above objects, a principal object of this invention is to improve the raising of young poultry by the use of a particulate litter and bedding material which is fireproof, dustless, and which is absorbent of liquids and gases.

Another object of this invention is the provision of a litter material which minimizes the occurrenece of breast blisters in young fowl.

These and other objects are achieved by the use of a particularly pure amorphous silica mined from deposits located in the State of Arkansas which, after foreign material has been physically separated from the same, is crushed, screened and sized, yields a dust free graded material which is neither too fine nor too coarse for use as a litter and bedding material for young poultry. The individual pieces are extremely porous and do not exhibit any noticeable tendecy to disintegrate when distributed over the floor of a brooder. The pieces are small enough to permit the young fowl to walk over it or sit on it without injury and each piece is substantially pure $SiO_2$ and exhibits a densty of 47½ lbs./ft.$^3$, and a pore volume of approximately 58%.

The use of this material as a litter or bedding in brooders is particularly advantageous for each of the following reasons:

(1) The amorphous silica particles are fireproof. Numerous brooder houses are lost to fire each year when young birds in scratching in litter material flick a piece of litter material, such as wood shavings, rice husks or other combustible litter into the flame of the heater in the brooder house and thereby set fire to the whole brooder house with consequent loss of all of the birds in the brooder house.

(2) The amorphous silica particles absorb water, therefore the brooder houses have a dry floor at all times when the particles are used as the litter material. The absorbed moisture is released slowly from the particles by evaporation and does not produce a wet floor at any time.

(3) The amorphous silica particles dehydrate and kill all parasitic life with which they come into contact.

(4) The amorphous silica particles are dustless. Dust in the poultry business is a known carrier of germs from one chicken to another. When particles of the proper size are used as a litter material the particles exhibit no tendency to form dust in use, e.g., due to the walking of the young fowl over the particles.

(5) The droppings of young turkeys and chickens have a strong ammonia smell or odor. When used as a litter material, the amorphous silica particles of this invention almost completely absorb this odor and keep the brooder substantially deodorized.

(6) The use of the amorphous silica particles of this invention as a litter material helps to prevent breast blisters. When organic materials are used as litter material they tend to build up heat due to processes and chemical reactions between the droppings and the litter material. When the young turkeys or chickens sit down to rest or sleep, the heat from organic litter material causes blemishes and/or blisters to form on the breast of the birds. These blemishes must be removed during the processing of the bird for food purposes and this results in a lower price to the grower and substantial loss in terms of net profit.

(7) The amorphous silica particles because of their porosity act as an insulating material. Brooder houses in which the particles were used were warmer in the winter and brooder houses littered with this material remained cooler, up to 10° and more during the hot summer days. In periods of very hot weather, if the young birds become overly warm it is a simple matter to spray water throughout the brooder house when using amorphous silica particles as the litter material, resulting in cooling another 10° to 20° as the water evaporated. Amorphous silica litter is not adversely affected by wetting, as it quickly releases the moisture to evaporation.

(8) The amorphous silica particles of this invention are white in color, and provide greater visibility, a cleaner house and require less artificial lighting than many other litter materials. The chickens are more readily located and cannot burrow under box lid feeders and suffocate.

(9) Because of the cleaner feeders and waterers, the absence of dust and increased visibility, young fowl tend to grow faster, waste less feed and do better when the amorphous silica particles of this invention are used as the litter material. The cleanness of this material results in much less work in housekeeping and a substantial savings in labor expense and/or effort to the grower.

(10) The amorphous silica particles being non-toxic in character, do not affect the bird when eaten.

This material is used in much the same way as other litter and bedding materials previously described in one or more of the following United States Patents: Laughlin, 2,279,405; Dreyling, 2,376,672; Paquette, 2,477,892; Gibbs, 2,649,759; Sawyer, et al. 3,029,783.

It is distinguishable over these and other litter materials heretofore known in this art in the fact that it may be utilized in the condition in which it is mined, once any foreign material has been separated from the amorphous silica and once it has been crushed and graded to the desired size particles. Because of its natural porosity and freedom from any organic matter it is not necessary to process the litter by means of either heat or chemicals (e.g., acids) to produce a synthetic pore structure.

Having now described the invention in accordance with the Patent Statutes it is not intended that it be limited except as may be required by the appended claim.

What is claimed as new is as follows:

A method of bedding young poultry which comprises providing a bed of naturally occurring amorphous silica particles comprising substantially pure $SiO_2$ having a particle size not greater than approximately one inch and not less than approximately one-half inch and a pore volume of approximately 58%, said amorphous silica slowly releasing the absorbed moisture from said particles by evaporation under ambient conditions.

References Cited by the Examiner
UNITED STATES PATENTS

| | | | |
|---|---|---|---|
| 2,114,123 | 4/1938 | Heuser | 23—182 |
| 2,848,976 | 8/1958 | Combs | 119—1 |
| 2,895,873 | 7/1959 | Sawyer | 167—42 |

SAMUEL KOREN, Primary Examiner.

ALDRICH F. MEDBERY, Examiner.